United States Patent Office 3,385,182
Patented May 28, 1968

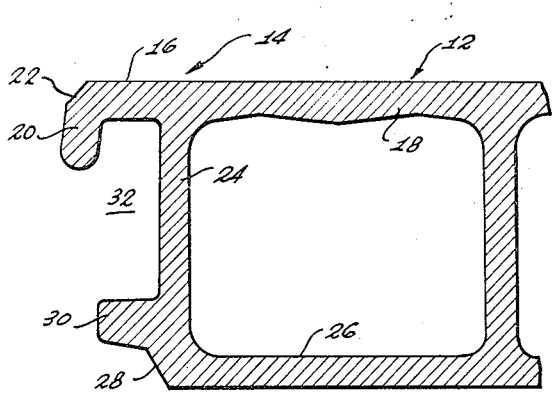
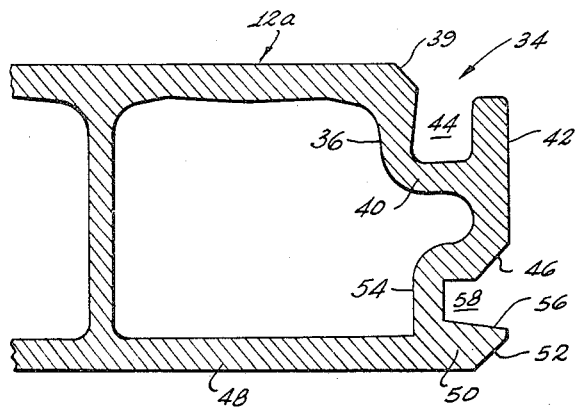
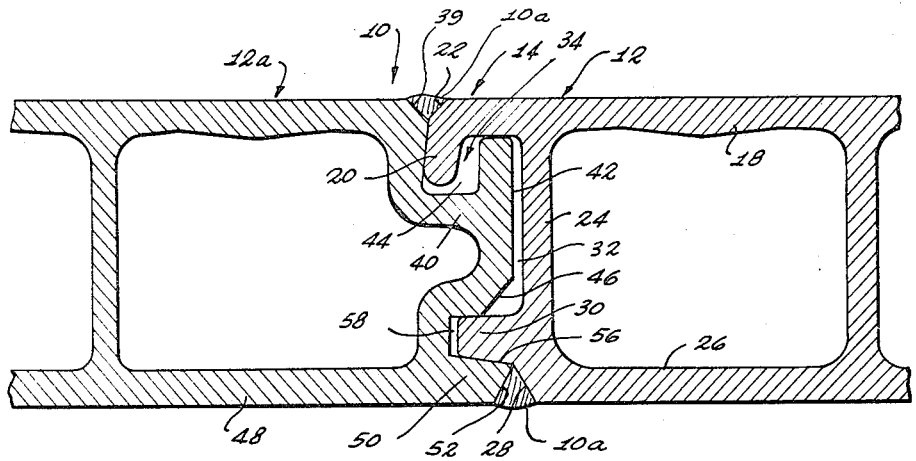

3,385,182
INTERLOCKING DEVICE FOR LOAD BEARING SURFACES SUCH AS AIRCRAFT LANDING MATS
Leo M. Harvey, Los Angeles, Calif., assignor to Harvey Aluminum, Torrance, Calif., a corporation of California
Filed Sept. 27, 1965, Ser. No. 490,520
6 Claims. (Cl. 94—13)

ABSTRACT OF THE DISCLOSURE

Metallic load bearing planks for use with other similar planks in assembly of a horizontally disposed platform for movement of vehicles over uneven terrain, for aircraft landing mats, and the like, in which a plurality of load bearing planks are interlocked to prevent substantial vertical and horizontal movement relative to each other while providing for easy assembly and permitting normal expansion and contraction due to temperature change. Each load bearing plank includes female interconnecting means along one of its longitudinal edges and male interconnecting means along its remaining longitudinal edge. The female interconnecting means include a pocket means opening upwardly in a vertical direction and a horizontally disposed pocket means opening outwardly from the center line of plank in a horizontal direction. The male interconnecting means include a male member extending in a downward vertical direction for interfitting with the upwardly opening pocket means for limiting horizontal movement between the planks. The male interconnecting means further include a horizontally disposed arm means for insertion in close fitting relationship into the horizontally disposed pocket means to substantially eliminate vertical movement between adjacent planks.

---

This invention relates generally to an interlocking device for load bearing surfaces which may be placed over uneven or otherwise adverse terrain to facilitate movement of vehicles over such terrain. The invention is more particularly directed to an interlocking structure for securely connecting the side members of planks which form a load bearing platform such as landing mat structure for aircraft and the like.

In providing a load bearing surface for the movement of vehicles over terrain of uneven and relatively soft composition, difficulty has been experienced in interconnecting the multiplicity of units which are required to form a sufficiently extensive load bearing platform for vehicles to traverse such terrain. The type of construction for a load bearing platform referred to herein is shown in application Ser. No. 296,555, filed July 22, 1963 now Patent No. 3,301,147 and entitled Aircraft Landing Mat and in application Ser. No. 478,693, filed Aug. 10, 1965 and entitled Plank for Modular Load Bearing Surfaces Such as Aircraft Landing Mats.

In assembling a platform of the type referred to herein a large number of individual plank members must be firmly and accurately interconnected in order to form a load bearing platform which will provide a stable and strong platform for the movement of vehicles thereon. In the interconnection of the individual plank members care must be taken that the interlocking structure provides a positive retainment of the individual plank members in a relatively fixed position in relation to the other plank members making up the platform. In particular, the interlocking structure must insure that excessive vertical movement is avoided so that uneven edges of individual plank members will not be exposed in such a manner that a sharp edge might be positioned so as to contact vulnerable tire structure or other members of aircraft or other vehicles which will utilize the platform. If jet aircraft, for example, land on this platform, these aircraft will contact the platform with severe force and any exposed edge caused by vertical movement of plank members within the platform, could create a fatal tearing or rupture of the tire or landing gear of the aircraft.

Of equal importance in interconnecting the planks of such a platform is the necessity of limiting plank movement in a horizontal direction since excessive horizontal movement will create gaps between plank members thus producing dangerous crevices into which the wheels of a vehicle using this platform could be entrapped, punctured and/or mutilated.

An additional problem to be considered in assembling a platform of this type is the ease with which individual plank members may be interconnected so that in a relatively short period of time an entire platform made up of a multiplicity of plank units, may be firmly and securely assembled.

Therefore, it is the general object of the present invention to provide a new and useful interlocking device for positively securing to each other adjacent plank members which make up a load bearing platform of the character described.

Another object of this invention is to provide an interlocking device for plank members which will prevent excessive movement of adjacent plank members relative to each other either in a vertical or horizontal direction.

Another object of this invention is to provide an interlocking device for plank members which facilitates rapid and easy interconnection of adjacent plank members.

Other objects, advantages or features of the invention will present themselves as the description proceeds.

With these and other objects in view the invention consists in the construction, arrangement and combination of parts of the invention whereby the objects contemplated are obtained as hereinafter set forth and brought out in the attached claims and in the attached drawings.

In these drawings:

FIG. 1 is a side view of the first section of the interlocking device;

FIG. 2 is a side view of the second section of the interlocking device; and

FIG. 3 shows the structures of FIG. 1 and FIG. 2 interconnected in the manner in which adjacent planks forming a load bearing platform are interconnected by the interlocking device of this invention.

Referring to the drawings it is seen that FIG. 3 illustrates the interlocking device 10 for this invention for interconnecting the left and right sides respectively of plank members 12 and 12a. FIG. 1 shows the left side connector 14 for plank 12. Side connector 14 consists of a horizontally extending arm 16 which is an extension of upper slab 18 of the plank 12. The left end of arm 16 as seen in FIG. 1 forms a downwardly extending lip 20. The upper left surface of lip 20 is provided with an approximately forty-five degree (45°) beveled edge 22 and the lip extends downwardly from arm 16 at an approximately seven degree (7°) angle.

A vertical rib 24 connects the upper and lower slabs 18 and 26 respectively of plank 12. The lower left portion of rib 24 is provided with an approximately thirty degree (30°) beveled outer edge 28. Directly above edge 28 rib 24 is provided with an outwardly extending, horizontally disposed arm 30. Lip 20 arm 16, rib 24 and arm 30 form pocket 32 which receives connecting structure of the second section of this interlocking device.

In FIG. 2 of the drawings the right side connector 34 for plank 12a is shown. Side connector 34 consists of a downwardly extending arm member 36 which is provided with a beveled outer edge 39 as seen in FIG. 2. The beveled edge 39 has a slope of approximately forty-five degrees (45°) from the horizontal. The lower portion 40 of member 36 extends horizontally to the vertically projected connector member 42. Arm 36, its horizontally extended portion 40 and the vertically projected member 42 form a pocket 44 which receives lip 20 of the first section of this interlocking device. The lower outer surface of member 42 has an outer beveled edge 46 of approximately forty-five degrees (45°).

The lower slab 48 of plank 12a extends horizontally to to form connector arm 50. Connector arm 50 has an outer beveled edge 52 of approximately thirty degrees (30°). A vertically disposed member 54 extends between slab 48 and connector member 42. The upper surface 56 of arm 50 has an approximately ten degree (10°) slope from the horizontal. Arm 50, member 54 and the lower portion of connector member 42 form a pocket 58 which receives arm 30 of the left side connector for the plank 12.

In assembling mat structure of the type referred to herein, planks 12 and 12a are positively retained in interlocking relationship by the mechanical linkage provided by the interlocking device of this invention. A weld 10a may be placed in both the upper and lower V sections of this interlocking device. However, in the event that a weld failure should occur, the planks 12 and 12a are still retained in an interlocking and close fitting relationship by this interlocking device.

The interlocking device of this invention is so constructed that each member of the respective side connectors easily fits into its proper position to make the firm mechanical connection as intended by this invention. Adequate tolerances have been provided so that some movement is permitted as will occur in the normal expansion and contraction of metals by changing temperatures yet, this interlocking device provides for a strong, positive secure connection of the plank members. Clearly, therefore, this invention is capable of obtaining the objects of the invention contained herein.

While the invention has been described as what as conceived to be its most practical and preferred embodiment, various modifications of the invention are possible within the appearance and scope of the following claims.

I claim:

1. Metallic load bearing plank for use with other similar planks in assembly of a horizontally disposed platform for movement of vehicles over uneven terrain, for aircraft landing mats, and the like, in which a plurality of load bearing planks are interlocked to prevent substantial vertical and horizontal movement relative to each other while providing for easy assembly and permitting normal expansion and contraction due to temperature change, the metallic load bearing plank comprising:

an elongated unitary body portion having an upper substantially flat slab surface and a lower substantially flat slab surface, which upper and lower slab surfaces are interconnected by vertically disposed load bearing ribs, continuous female interconnecting means formed integral with the body portion of the plank means and extending along one longitudinal side of the body portion, continuous male interconnecting means formed integral with the body portion of the plank means and extending along the remaining longitudinal side of the body portion, the continuous female and male interconnecting means being complementary with male and female interconnecting means respectively on similar metallic load bearing planks, the continuous female interconnecting means defining a vertically disposed pocket means opening upwardly in a direction transverse to the upper slab surface along said one longitudinal side of the body portion; and a horizontally disposed pocket means opening in a direction substantially parallel to the lower slab surface and spaced from the lower slab surface in the direction of the upper slab surface, the continuous male interconnecting means including vertically disposed lip means extending downwardly from the plane of the upper slab surface and adapted to interfit with the vertically disposed pocket means defined by the continuous female interconnecting means to prevent substantial horizontal relative movement between interlocked planks and further including horizontally disposed arm means extending in a plane substantially parallel to the lower slab surface and spaced from the lower slab surface in the direction of the upper slab surface and adapted to interfit with the horizontally disposed pocket means defined by the continuous female interconnecting means in close fitting interlocking relationship to prevent substantial vertical relative movement between interlocked planks when a plurality of load bearing planks are assembled in a horizontally disposed platform with their respective upper and lower slab surfaces being substantially coplanar.

2. The structure of claim 1 in which the horizontally disposed pocket means defined by the continuous female interconnecting means includes beveled edge means for angled entry of the horizontally disposed arm means of the continuous male interconnecting means.

3. The structure of claim 1 in which the vertically disposed downwardly projected lip of the continuous male interconnecting means has an angle of about seven degrees from perpendicular to the upper slab surface of the body member, such angled relationship being in a direction away from the longitudinal center line of the elongated body portion of the metallic load bearing plank.

4. The structure of claim 1 in which the horizontally disposed arm means of the continuous male interconnecting means includes an upper flat surface which is substantially parallel to the upper slab surface of the body member and a lower surface sloping at an angle of about ten degrees from the horizontal so as to increase the cross-sectional area of the horizontally disposed arm means in approaching the longitudinal centerline of the elongated body member.

5. The structure of claim 4 in which the horizontally disposed pocket means defined by the continuous female interconnecting means includes a lower side surface sloped at an angle of about ten degrees from the horizontal so as to decrease the cross-sectional area of the horizontally disposed pocket means in approching the longitudinal centerline of the elongated body member.

6. The structure of claim 1 in which the upper and lower slab surfaces are beveled at points of juncture between interlocked load bearing planks to form V-shaped sections for receiving weld material.

References Cited

UNITED STATES PATENTS

| 1,913,342 | 6/1933 | Schaffert | 52—579 X |
| 3,172,508 | 3/1965 | Doering et al. | |
| 3,175,476 | 3/1965 | Franks | 94—13 |
| 3,301,147 | 1/1967 | Clayton et al. | 94—13 |

JACOB L. NACKENOFF, *Primary Examiner.*